United States Patent
Armstrong (10) Patent No.: US 9,201,622 B2
(45) Date of Patent: Dec. 1, 2015

(54) DEVICES, SYSTEMS, AND METHODS FOR COMMUNICATING WITH AN IMAGE-FORMING DEVICE FROM A MOBILE DEVICE

(71) Applicant: CANON KABUSHIKI KAISHA, Tokyo (JP)

(72) Inventor: Charles Thomas Armstrong, Rancho Santa Margarita, CA (US)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/265,041

(22) Filed: Apr. 29, 2014

(65) Prior Publication Data

US 2015/0309760 A1 Oct. 29, 2015

(51) Int. Cl.
*G06F 3/12* (2006.01)
*G06K 15/00* (2006.01)

(52) U.S. Cl.
CPC .............. *G06F 3/1292* (2013.01); *G06F 3/126* (2013.01)

(58) Field of Classification Search
None
See application file for complete search history.

(56) References Cited

U.S. PATENT DOCUMENTS

| | | | |
|---|---|---|---|
| 2006/0230132 A1 | 10/2006 | Dogra | |
| 2008/0178200 A1 | 7/2008 | Kaneko | |
| 2009/0168091 A1 | 7/2009 | Fu | |
| 2012/0057193 A1 | 3/2012 | Jazayeri | |
| 2012/0092721 A1 | 4/2012 | Jaudon | |
| 2012/0194854 A1 | 8/2012 | Tang | |
| 2012/0212768 A1 | 8/2012 | Evanitsky | |
| 2012/0287460 A1 | 11/2012 | McMillin | |
| 2013/0211563 A1 | 8/2013 | Ellis | |
| 2013/0268624 A1* | 10/2013 | Yagiura | 709/217 |

OTHER PUBLICATIONS

Tricerat, Screwdrivers product web page, downloaded Aug. 2013 from http://www.tricerat.com/products/screwdrivers.
Tricerat, Screwdrivers product brochure, downloaded Aug. 2013.
Cortado, ThinPrint Client Manual, Jan. 2013.
Cortado, ThinPrint Server Engine Manual, Jul. 2013.

* cited by examiner

*Primary Examiner* — Dov Popovici
(74) *Attorney, Agent, or Firm* — Canon U.S.A., Inc. IP Division (57) ABSTRACT

Systems, devices, and methods for device communication receive, at a proxy device, an image of a barcode that was sent from a mobile device, wherein the barcode includes device information for an image-forming device, and wherein the device information identifies a network of the image-forming device; send the device information from the proxy device to one or more support devices; and at the one or more support devices, determine if the respective support device is connected to the network of the image-forming device, and in response to determining that the respective support device is connected to the network of the image-forming device, generate an output queue for the image-forming device on the support device that is connected to the network of the image-forming device.

19 Claims, 10 Drawing Sheets

DEVICES, SYSTEMS, AND METHODS FOR COMMUNICATING WITH AN IMAGE-FORMING DEVICE FROM A MOBILE DEVICE

BACKGROUND

1. Technical Field

This description generally relates to additive manufacturing and subtractive manufacturing.

2. Background

Some printing systems implement device discovery, printer-driver management, and universal plug-and-play. These systems can discover devices on their local network and, after receiving a selection of a discovered device, proceed to obtain information about the selected device and search for a printer driver for the selected device if an appropriate printer driver is not already installed. If a matching printer driver is found, these systems install the driver, create a print queue, and set the correct port. However, these systems may not work well for devices that do not operate in a typical desktop system.

SUMMARY

In one embodiment, a method for device communication comprises receiving, at a proxy device, an image of a barcode that was sent from a mobile device, wherein the barcode includes device information for an image-forming device, and wherein the device information identifies a network of the image-forming device; sending the device information from the proxy device to one or more support devices; and at the one or more support devices, determining if the respective support device is connected to the network of the image-forming device, and in response to determining that the respective support device is connected to the network of the image-forming device, generating an output queue for the image-forming device on the support device that is connected to the network of the image-forming device.

In one embodiment, a device comprises one or more computer-readable media; one or more network interfaces; and one or more processors that are coupled to the one or more computer-readable media and the one or more network interfaces and that are configured to cause the device to receive device information from a mobile device, wherein the device information identifies an image-forming device, send the device information to candidate support devices in a first group of support devices, receive a notification of success from a first support device, receive an output request from the mobile device, and send the output request to the first support device.

In one embodiment, one or more computer-readable media store instructions that, when executed by one or more computing devices, cause the computing devices to perform operations that comprise receiving an image of a barcode that was sent by a first device at a proxy device, wherein the barcode includes device information for an image-forming device; sending the printer information to one or more support devices from the proxy device; and at the one or more support devices, determining if the respective support device is connected to a network of the image-forming device, and in response to determining that the respective support device is connected to the network of the image-forming device, sending a notification of success to the proxy device.

DESCRIPTION

The following disclosure describes certain explanatory embodiments. Other embodiments may include alternatives, equivalents, and modifications. Additionally, the explanatory embodiments may include several novel features, and a particular feature may not be essential to some embodiments of the devices, systems, and methods described herein.

Figure 1:
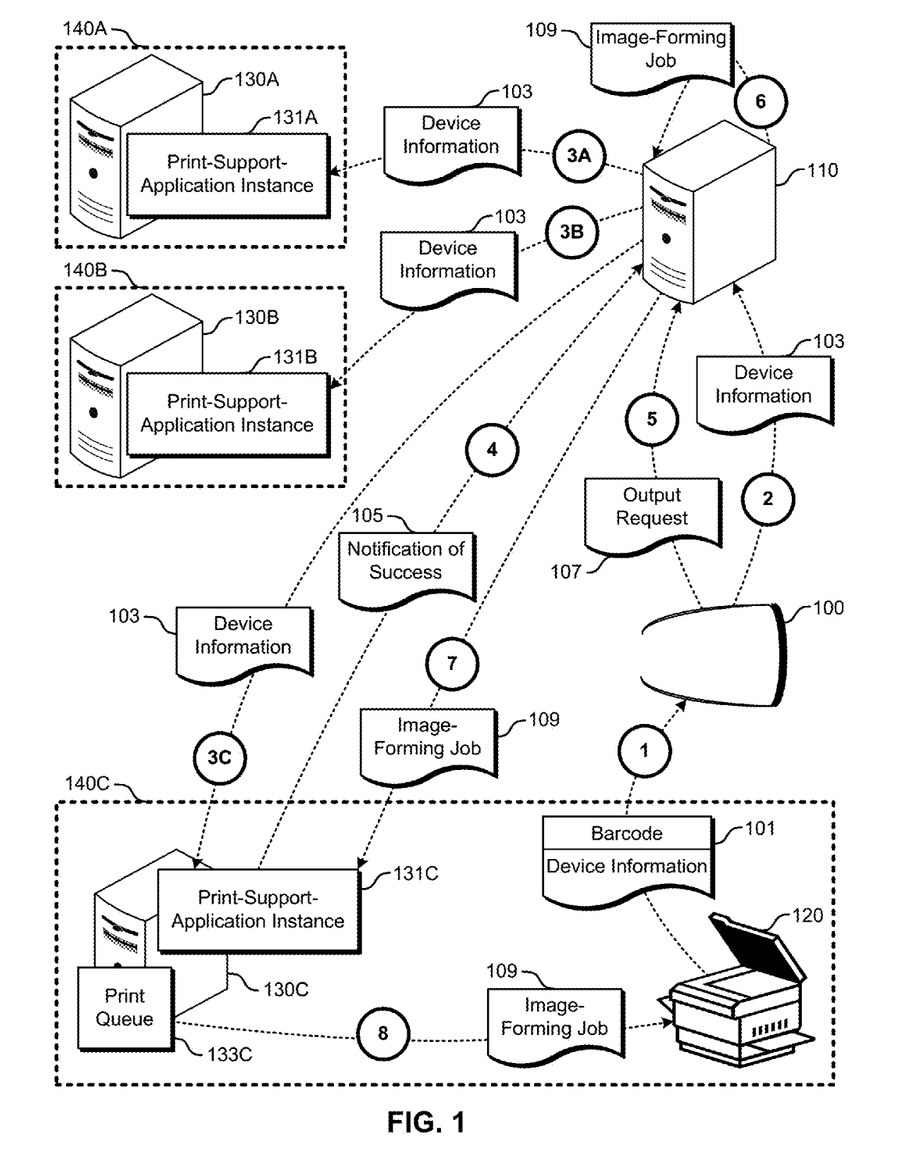
FIG. 1 illustrates an example embodiment of a system for communicating with an image-forming device and an example embodiment of the flow of operations in the system.

FIG. 1 illustrates an example embodiment of a system for communicating with an image-forming device and an example embodiment of the flow of operations in the system. The system includes a wearable computing device 100, a proxy 110, an image-forming device 120, and three print-support devices 130A-C. Other embodiments may include more or fewer print-support devices 130. The wearable computing device 100 is a less-versatile, limited-user-interaction-model, light-weight computing device that can be worn by a user and which may have limited form-factor capabilities when compared to a smartphone, a desktop computing device, a laptop computing device, or a tablet computing device. For example, the display of the wearable computing device 100 may be smaller, the wearable computing device 100 may have less than 5 buttons and switches, the wearable computing device 100 may not have a touch-screen input, the wearable computing device 100 may have less memory or storage, the wearable computing device 100 may have less battery power, the wearable computing device 100 may have less computing power, and the wearable computing device 100 may have less network-communication capabilities (e.g., may not support domain networks or certificate-based enterprise wireless networks). Also, the wearable-computing device 100 may not be able to communicate with the print-support devices 130 or the image-forming device 120 without using the proxy 110.

The proxy 110 includes one or more computing devices, and may be implemented in a distributed-computing environment. A print-support device 130 operates a respective print-support-application instance 131. A print-support-application instance 131 is configured to communicate with the proxy 110, search for image-forming devices 120 that can communicate with the print-support device 130, and initiate the generation of a print queue 133 on the print-support device 130. In the embodiment shown in FIG. 1, the print-support devices 130A-C operate in respective local networks 140A-C. Additionally, a print-support device 130 may also operate a driver for the image-forming device 120.

The image-forming device 120 is an additive manufacturing device (e.g., an inkjet printer, a laser printer, a "3D" printer) or a subtractive manufacturing device that generates an image (e.g., a two-dimensional image, a three-dimensional image) from one or more media (e.g., paper, plastic, metal, paint, adhesive, ink, toner). Although the image-forming device 120 may be a subtractive manufacturing device, for purposes of description the term "print" refers to any image forming from one or more media. An image-forming job 109 defines the image that the image-forming device 120 generates. The image-forming device 120 may be capable of driverless printing or may include its own driver.

Also, the image-forming device 120 may be able to generate a barcode 101 (e.g., one-dimensional barcode, a two-dimensional barcode) that encodes device information, for example a name of the image-forming device 120, a network address of the image-forming device 120, a subnet of the image-forming device 120, a network of the image-forming device 120, and a physical location of the image-forming device 120. The image-forming device 120 may also be able to show the barcode 101 on a display of the image-forming device 120 or form an image of the barcode on a medium (e.g., print an image of the barcode on paper). However, in some embodiments, another device generates the barcode 101, another device displays the barcode 101, or another device forms an image of the barcode 101 on a medium. Furthermore, other embodiments may use other device-identification marks in addition to or in lieu of the barcode 101. Other device-identification marks include photos of the location of the image-forming device 120 and GPS coordinates of the image-forming device 120.

In stage 1, the wearable computing device 100 captures an image of the barcode 101 that is associated with the image-forming device 120. For example, the barcode 101 may be presented on a display of the image-forming device 120, and a user may capture an image of the barcode 101 with a camera of the wearable computing device 100. The wearable computing device 100 extracts the device information 103 from the barcode 101 and then sends the device information 103 to the proxy 110 in stage 2.

The proxy 110 maintains a list of users and their print-support-application instances 131 (e.g., print-support applications instances 131A-C). A print-support-application instance 131 may register itself with the proxy 110, for example in response to a user command or in response to being activated for the first time. Also, a user may register a print-support-application instance 131. In stage 3, the proxy 110 sends the device information 103 to all of, or to a subset of, the print-support-application instances 131 that are included in the list. The proxy 110 also may send an explicit request with the device information 103 that asks a print-support-application instance 131 if it is operating on a print-support device 130 that can communicate with the image-forming device 120 that is identified by the device information 103. Thus, in FIG. 1, in stage 3A the proxy 110 sends the device information 103 to a first print-support-application instance 131A, in stage 3B the proxy 110 sends the device information 103 to a second print-support-application instance 131B, and in stage 3C the proxy 110 sends the device information 103 to a third print-support-application instance 131C.

After receiving the device information 103, a print-support-application instance 131 determines if it is operating on a print-support device 130 that can communicate with the image-forming apparatus 120 that is identified by the device information 103. For example, a print-support device 130 may determine that it is able to communicate with the image-forming device 120 if the print-support device 130 can communicate with a network 140 that the image-forming device 120 can communicate with. If the print-support-application instance 131 determines that its respective print-support device 130 cannot communicate with the image-forming device 120, then the print-support-application instance 131 may send a reply to the proxy 110 that indicates that it cannot, or the print-support-application instance 131 may not send any reply to the proxy 110. However, if the print-support-application instance 131 determines that its respective print-support device 130 can communicate with the image-forming device 120, then in stage 4 the print-support-application instance 131 sends a notification of success 105. Also, the print-support-application instance 131 may initiate the generation of a print queue 133 for the image-forming device 120 and may initiate the installation of a driver for the image-forming device 120 on a print-support device 130 that can communicate with the image-forming device 120. Thus, in FIG. 1, the first print-support-application instance 131A and the second print-support-application instance 131B may not send any replies to the proxy 110 or may each send a notification of failure to the proxy 110. Also, the third print-support-application instance 131C, which operates on a print-support device 130C that shares a third network 140C with the image-forming device 120, sends a notification of success 105 to the proxy 110 in stage 4. The third print-support-application instance 131C may initiate the generation of a print queue 133C on the third print-support device 130C for the image-forming device 120, for example if the third print-support device 130C does not already have a print queue 133C for the image-forming device 120. The proxy 110 then creates and stores a record that indicates that the third print-support-application instance 131C operates on a print-support device 130C that can communicate with the image-forming device 120 that was identified by the device information 103.

In stage 5, the wearable computing device 100 sends an output request 107 to the proxy 110. The output request 107 may include an image-forming job 109 or identify a storage location of the image-forming job 109. If the output request 107 (e.g., a print request) identifies a storage location of the image-forming job 109, the proxy 110 attempts to retrieve the image-forming job 109 (e.g., a print job) in stage 6. Then in stage 7, the proxy 110 sends the image-forming job 109 to the print-support-application instance 131C that can communicate with the image-forming device 120, and the print-support-application instance 131C sends the image-forming job 109 to the print queue 133C for the image-forming device 120. Finally, in stage 8 the print queue 133C sends the image-forming job 109 to the image-forming device 120.

Figure 2:
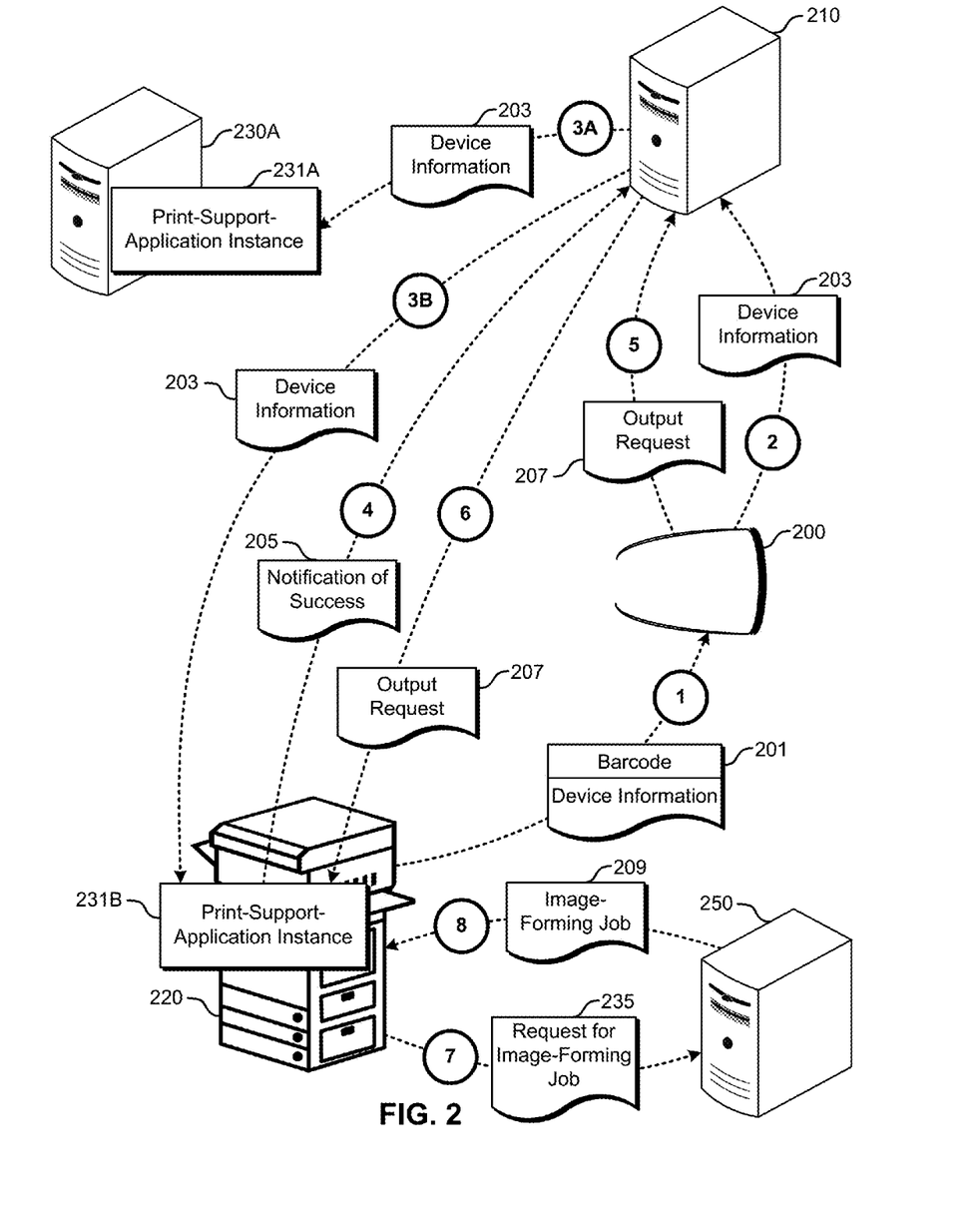
FIG. 2 illustrates an example embodiment of a system for communicating with an image-forming device and an example embodiment of the flow of operations in the system.

FIG. 2 illustrates an example embodiment of a system for communicating with an image-forming device and an example embodiment of the flow of operations in the system. In this embodiment, the image-forming device 220 operates a print-support application instance 231B. In stage 1, a wearable computing device 200 scans a barcode 201, which encodes printer information for an image-forming device 220. In stage 2, the wearable computing device 200 sends the device information 203 to a proxy 210. Next, in stages 3A and 3B, the proxy 210 sends the device information 203, or a part thereof, to print-support-application instances 231A-B. Each of the print-support-application instances 231A-B determines if it can communicate with the image-forming device 220 that is identified by the device information 203. In stage 4, the print-support-application instance 231B of the image-forming device 220 sends a notification of success 205 to the proxy 210. The proxy 210 generates and stores a record that associates the image-forming device 220 with the print-support-application instance 231B that can communicate with the image-forming device 220.

In stage 5, the wearable computing device 200 sends an output request 207 to the proxy 210. The proxy 210 sends the output request 207 to the print-support-application instance 231B in stage 6. The print-support-application instance 231B identifies an image-forming job and a print-job-storage device 250 that stores the image-forming job based on the output request 207. Following, in stage 7 the print-support-application instance 231B initiates the sending of a request for the image-forming job 235 to the print-job-storage device 250. Finally, in stage 8 the print-job-storage device 250 sends the image-forming job 209 to the image-forming device 220.

Figure 3:
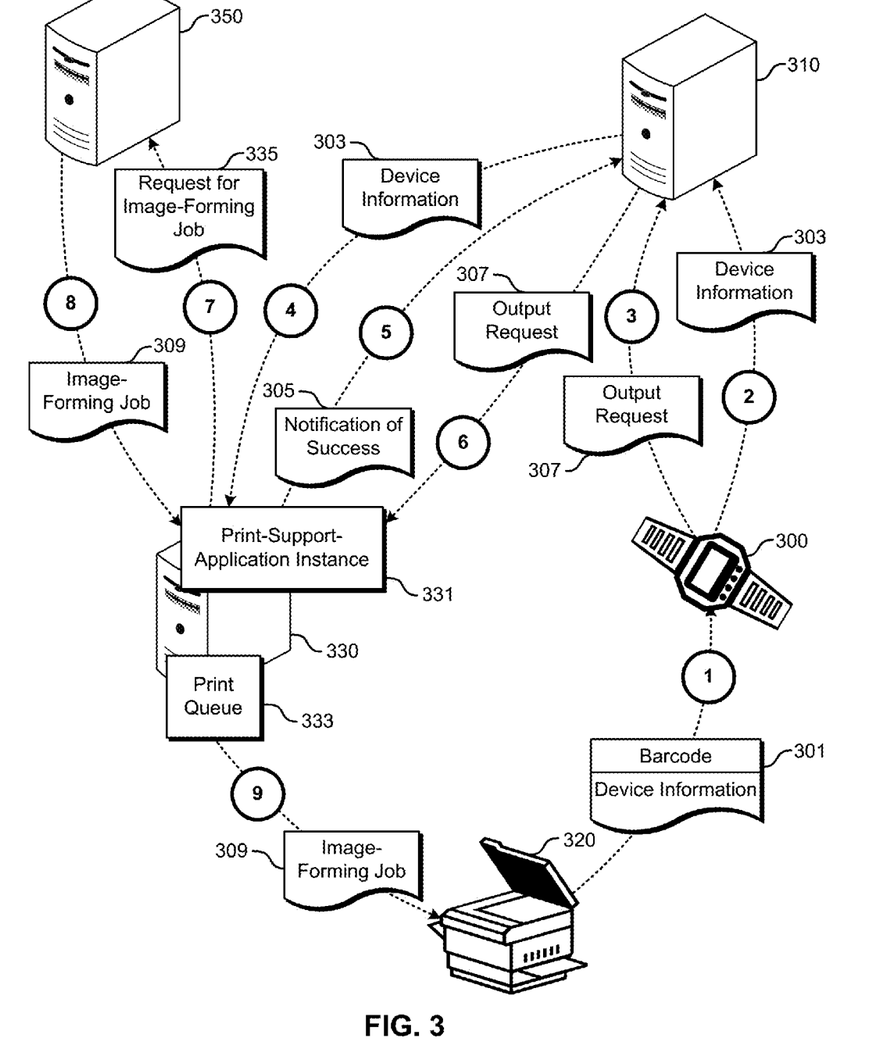
FIG. 3 illustrates an example embodiment of a system for communicating with an image-forming device and an example embodiment of the flow of operations in the system.

FIG. 3 illustrates an example embodiment of a system for communicating with an image-forming device and an example embodiment of the flow of operations in the system. In stage 1, a wearable computing device 300 captures an image of a barcode 301, which encodes printer information for an image-forming device 320. In stage 2, the wearable computing device 300 sends the device information 303 to a proxy 310, and in stage 3, the wearable computing device 300 sends an output request 307 to the proxy 310.

Next, in stage 4, the proxy 310 sends the device information 303, or a part thereof, to the print-support-application instance 331 on the print-support device 330. The print-support-application instance 331 determines that it can communicate with the image-forming device 320 that is identified by the device information 303. In stage 5, the print-support-application instance 331 sends a notification of success 305 to the proxy 310. Also, if the print-support device 330 does not already have a print queue 333 for the image-forming device 320, then the print-support-application instance 331 initiates the generation of a print queue 333 for the image-forming device 310 on the print-support device 330. After receiving the notification of success 305, the proxy 310 generates and stores a record that associates the image-forming device 320 with the print-support-application instance 331.

The proxy 310 sends the output request 307 to the print-support-application instance 331 in stage 6. The print-support-application instance 331 identifies an image-forming job and a print-job-storage device 350 that stores the image-forming job based on the output request 307. Following, in stage 7 the print-support-application instance 331 initiates the sending of a request for the image-forming job 335 to the print-job-storage device 350. Next, in stage 8 the print-job-storage device 350 sends the image-forming job 309 to the print-support-application instance 331, which sends the image-forming job 309 to the print queue 333. Finally, in stage 9 the print queue 333 sends the image-forming job 309 to the image-forming device 320.

Figure 4:
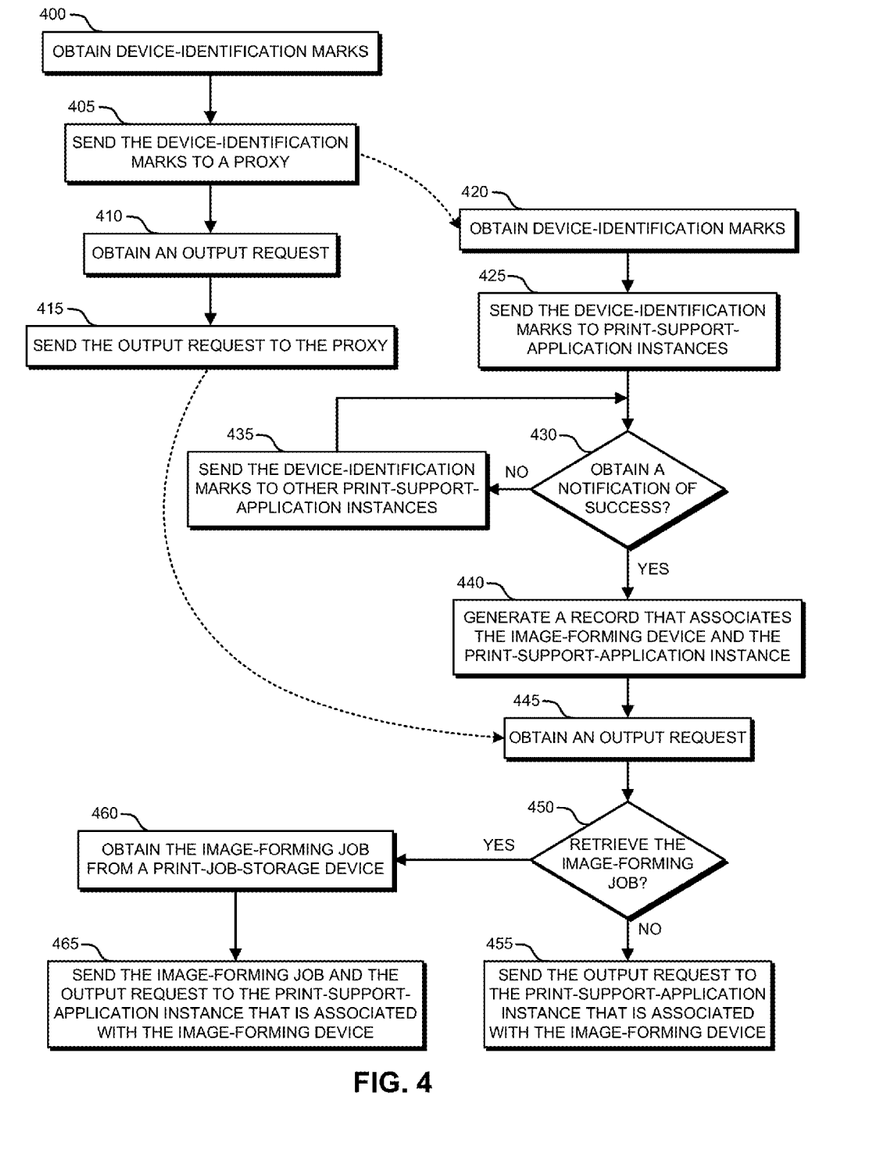
FIG. 4 illustrates example embodiments of operational flows for communicating with an image-forming device.

FIG. 4 illustrates example embodiments of operational flows for communicating with an image-forming device. The blocks of this operational flow and the other operational flows that are described herein may be performed by one or more computing devices, for example the systems and devices described herein. Also, although this operational flow and the other operational flows that are described herein are each presented in a respective order, some embodiments may perform at least some of the operations in different orders than the presented orders. Examples of possible different orderings include concurrent, overlapping, reordered, simultaneous, incremental, and interleaved orderings. Thus, other embodiments of this operational flow and the other operational flows that are described herein may omit blocks, add blocks, change the order of the blocks, combine blocks, or divide blocks into more blocks.

A first flow starts in block 400, where a wearable computing device obtains device-identification marks from an image-forming device. The first flow then moves to block 405, where the wearable computing device sends the device-identification marks to a proxy. Also, the wearable device may send a user identifier to the proxy. The first flow then proceeds to block 410, where the wearable computing device obtains an output request, for example via a voice command from a user. Then in block 415, the output request is sent to the proxy.

The second flow starts in block 420, where a proxy obtains device-identification marks from the wearable device. The second flow then proceeds to block 425, where the proxy sends the device-identification marks to print-support-application instances. The proxy may also obtain a user identifier with the device-identification marks. In some embodiments, the proxy maintains records that associate user identifiers with respective groups of print-support-application instances, and the proxy sends the device-identification marks to the one or more print-support-application instances that are associated with the obtained user identifier. Also, in some embodiments the proxy maintains records that associate device-identification marks with one or more print-support-application instances, and the proxy send the device-identification marks to the print-support-application instances that are associated with the device-identification marks.

The second flow then moves to block 430, where the proxy determines if it has obtained a notification of success from a print-support-application instance. If yes (block 430=YES), then the second flow moves to block 440. If not (block 430=NO), then the second flow moves to block 435, where the device identification marks are sent to other print-support-application instances. For example, in block 425 the proxy may send the device-identification marks to any print-support-application instances that are associated device-identification marks, and in block 435 the proxy may send the device-identification marks to print-support-application instances that are associated with the user identifier. After block 435, the second flow then returns to block 430. If block 435 is performed again, the proxy may send the device-identification marks to the print-support-application instances that are not associated with the user identifier or the device-identification marks. If block 435 has been performed a certain number of times, the second flow may stop and return an error.

In block 440, the proxy generates a record that associates the image-forming device and the print-support-application instance if the proxy does not already have such a record. Also, the proxy may generate a record that associates the print-support-application instance with the user identifier. The second flow then moves to block 445, where an output request is obtained from the wearable computing device, and then the second flow moves to block 450.

In block 450, the proxy determines if it should retrieve the image-forming job that is identified by the output request. The proxy may determine that it should retrieve the image-forming job if the wearable computing device does not send the image-forming job to the proxy and if the output request indicates that the proxy should not retrieve the image-forming job. If the proxy determines that it should not retrieve the image-forming job (block 450=NO), then the second flow moves to block 455, where the proxy sends the output request to the print-support-application instance that is associated with the image-forming device. If the proxy determines that it should retrieve the image-forming job (block 450=YES), then the second flow proceeds to block 460, where the proxy obtains the image-forming job from a print-job-storage device, which may be indicated in the output request. The second flow then moves to block 465, where the image-forming job and the output request are sent to the print-support-application instance that is associated with the image-forming device.

Figure 5:
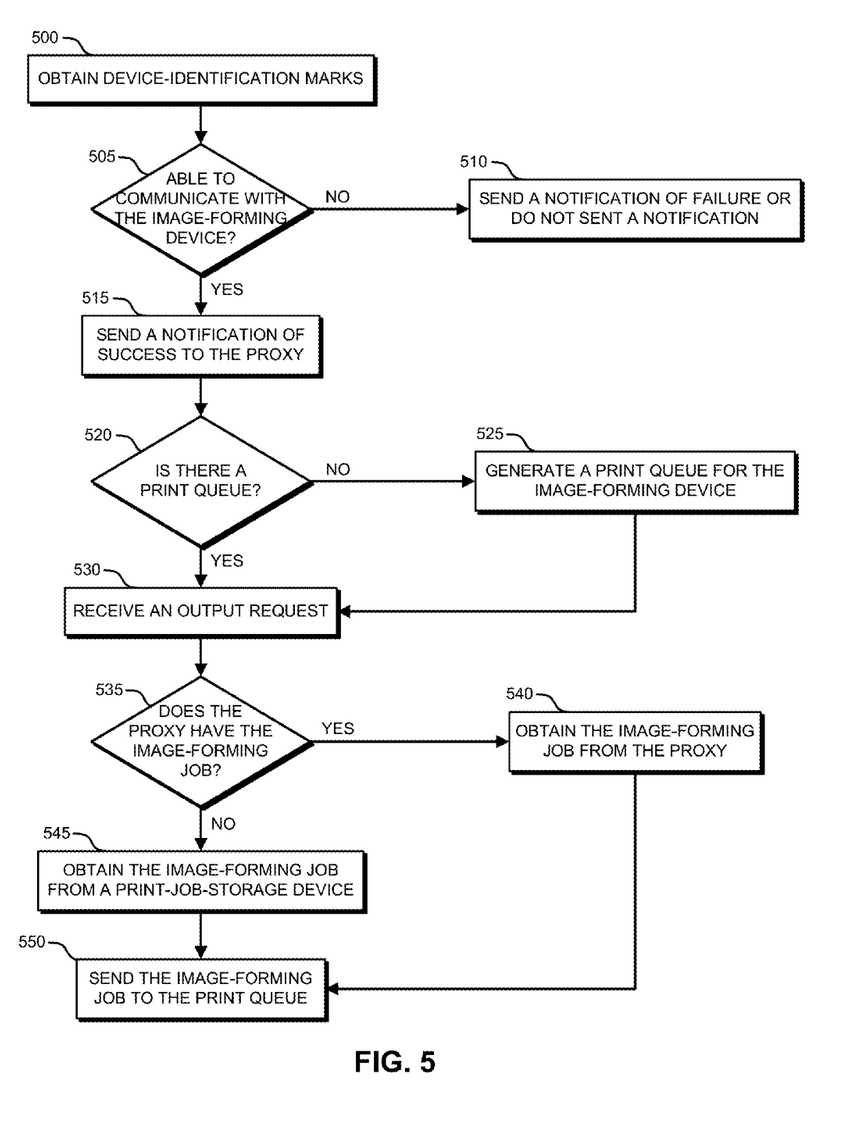
FIG. 5 illustrates an example embodiment of an operational flow for communicating with an image-forming device.

FIG. 5 illustrates an example embodiment of an operational flow for communicating with an image-forming device. In block 500, a print-support-application instance obtains device-identification marks from a proxy. The flow then moves to block 505, where the print-support-application instance determines if it is able to communicate with the image-forming device that is identified by the device-identification marks. If the print-support-application instance determines that it is not able (block 505=NO), then the flow moves to block 510, where the print-support-application instance sends the proxy a notification of failure or the print-support-application instance does not send a notification, and then the flow ends. If the print-support-application instance determines that it is able (block 505=YES), then the flow moves to block 515. In block 515, the print-support-application instance sends a notification of success to the proxy.

Next, in block 520, the print-support-application instance determines if the computing device on which it operates has a print queue for the image-forming device. If the print-support-application instance determines that there is a print queue (block 520=YES), then the flow moves to block 530. If the print-support-application instance determines that there is not a print queue (block 520=NO), then the flow moves to block 525, where the print-support-application instance initiates the generation of a print queue for the image-forming device on the computing device that operates the print-support-application instance, and then the flow moves to block 530.

In block 530, the print-support-application instance receives an output request. Next, in block 535, the print-support-application instance determines if the proxy has the image-forming job (e.g., the proxy received it from the wearable computing device, the proxy retrieved it from a print-job-storage). If the print-support-application instance determines that the proxy has the image-forming job (block 535=YES), then the flow moves to block 540, where the print-support-application instance obtains the image-forming job from the proxy, and the flow then proceeds to block 550. If the print-support-application instance determines that the proxy does not have the image-forming job (block 535=NO), then the flow moves to block 545. In block 545, the print-support-application instance obtains the image-forming job from a print-job-storage device. The flow then moves to block 550. In block 550, the image-forming job is sent to the print queue.

Figure 6:
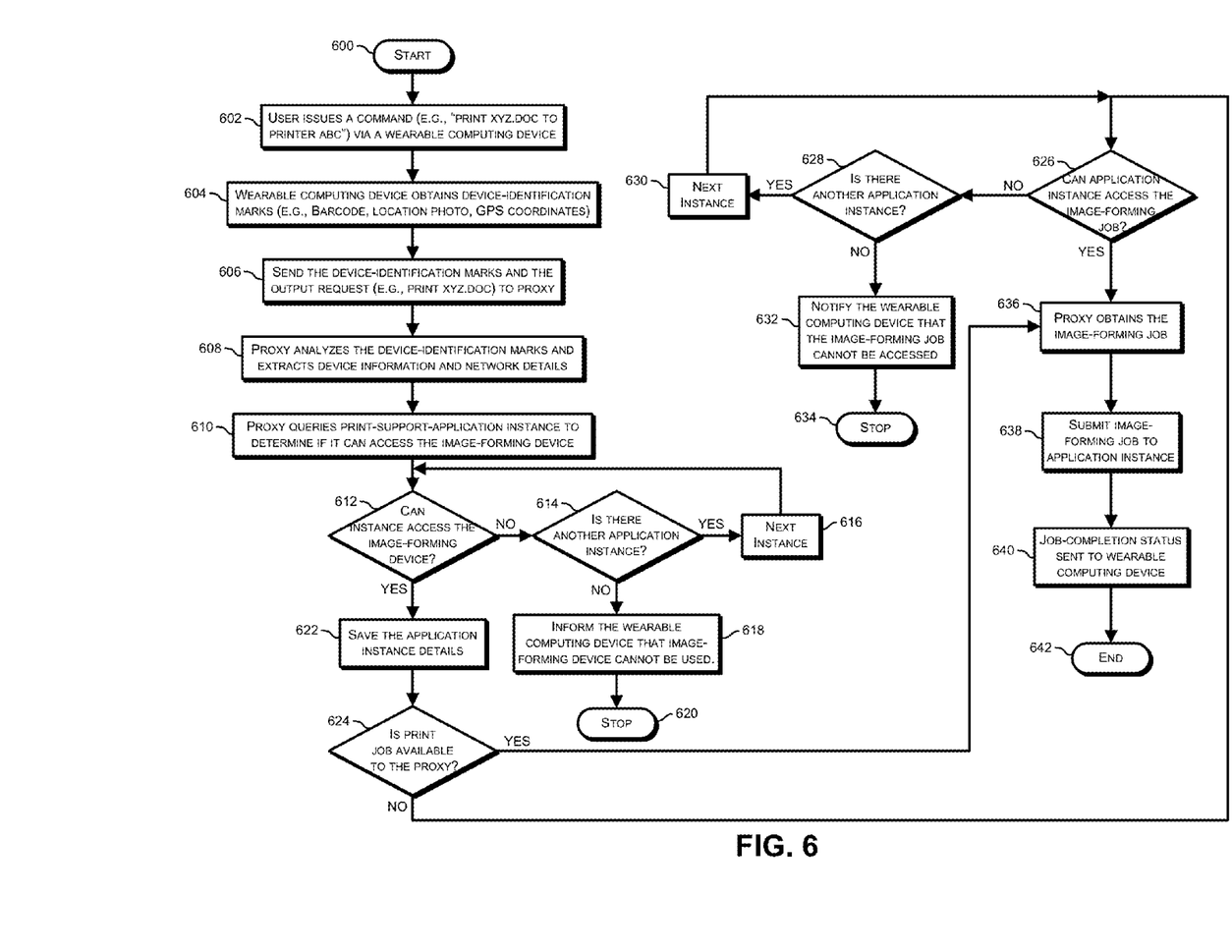
FIG. 6 illustrates an example embodiment of an operational flow for communicating with an image-forming device.

FIG. 6 illustrates an example embodiment of an operational flow for communicating with an image-forming device. The flow starts in block 600, and then moves to block 602, where a user issues a command (e.g., "print XYZ.doc to printer ABC") via a wearable computing device. Next, in block 604, the wearable computing device obtains device-identifications marks (e.g., a barcode, a location photo, GPS coordinates) of the image-forming device to which the user wants to send the image-forming job. Following, in block 606, the wearable device sends the device-identification marks and the output request, which is based on the command, to a proxy.

The flow then moves to block 608, where the proxy analyzes the device-identification marks and extract device information and network details from the device-identification marks or based on the device-identification marks. For example, the proxy may extract a device identifier from the device-identification marks, and then use the device identifier to locate a corresponding record for the device in a database. Also, the record may describe network details for the device.

Next, in block 610, the proxy queries a next (i.e., first in block 610) print-support-application instance to determine if the print-support application instance can access the image-forming device. In block 612, the proxy determines if the next print-support-application instance can access the image-forming device. If the proxy determines that the next print-support-application instance can access the image-forming device (block 612=YES), for example by receiving an affirmative reply from the next print-support-application instance, then the flow moves to block 622. If the proxy determines that the next print-support-application instance cannot access the image-forming device (block 612=NO), then the flow moves to block 614, where the proxy determines if there is another print-support-application instance that has not been queried. If the proxy determines that there is not (block 614=NO), then the flow moves to block 618, where the proxy informs the wearable computing device that the image-forming device cannot be used, and then the flow ends in block 620. However, if the proxy determines that there is another print-support-application instance that has not been queried (block 614=YES), then the flow moves to block 616, where the proxy denotes the print-support-application instance that has not been queried as the next print-support-application instance, and then queries the next print-support-application instance. The flow then returns to block 612.

In block 622, the proxy saves the details of the successful print-support-application instance in a database. The flow then moves to block 624, where the proxy determines if the image-forming job is available to the proxy. If the proxy determines that the image-forming job is available to the proxy (block 624=YES), for example if the wearable computing device sends the image-forming job to the proxy or if the proxy can access the storage location of the image-forming job, then the flow moves to block 636. If the proxy determines that the image-forming job is not available to the proxy (block 624=NO), then the flow moves to block 626.

In block 626, the proxy queries a print-support-application instance to determine if the print-support-application instance can access the image-forming job. If the proxy determines that the print-support-application instance can access the image-forming job (block 626=YES), then the flow moves to block 636. Otherwise (block 626=NO), then the flow moves to block 628. In block 628, the proxy determines if there is another print-support-application instance that the proxy has not yet queried about accessing the image-forming job. If the proxy determines that there is not another print-support-application instance (block 628=NO), then the flow moves to block 632, where the proxy notifies the wearable computing device that the image-forming job cannot be accessed, and then the flow ends in block 634. However, if the proxy determines that there is another print-support-application instance (block 628=YES), then the flow moves to block 630, where the proxy sets the next print-support-application instance to the instance that will be queried, and then the flow returns to block 626.

In block 636, the proxy obtains the image-forming job (e.g., from a print-support-application instance, from a print-job-storage device). Then in block 638, the proxy submits the image-forming job to the print-support-application instance that can communicate with the image-forming device. In some embodiments, the print-support-application instance that can communicate with the image-forming device is also the print-support-application instance that can access the image-forming job, and in these embodiments, blocks 624-638 may be omitted or modified. Finally, in block 640, the proxy sends a job-completion status to the wearable computing device, and then the flow ends in block 642.

Figure 7:
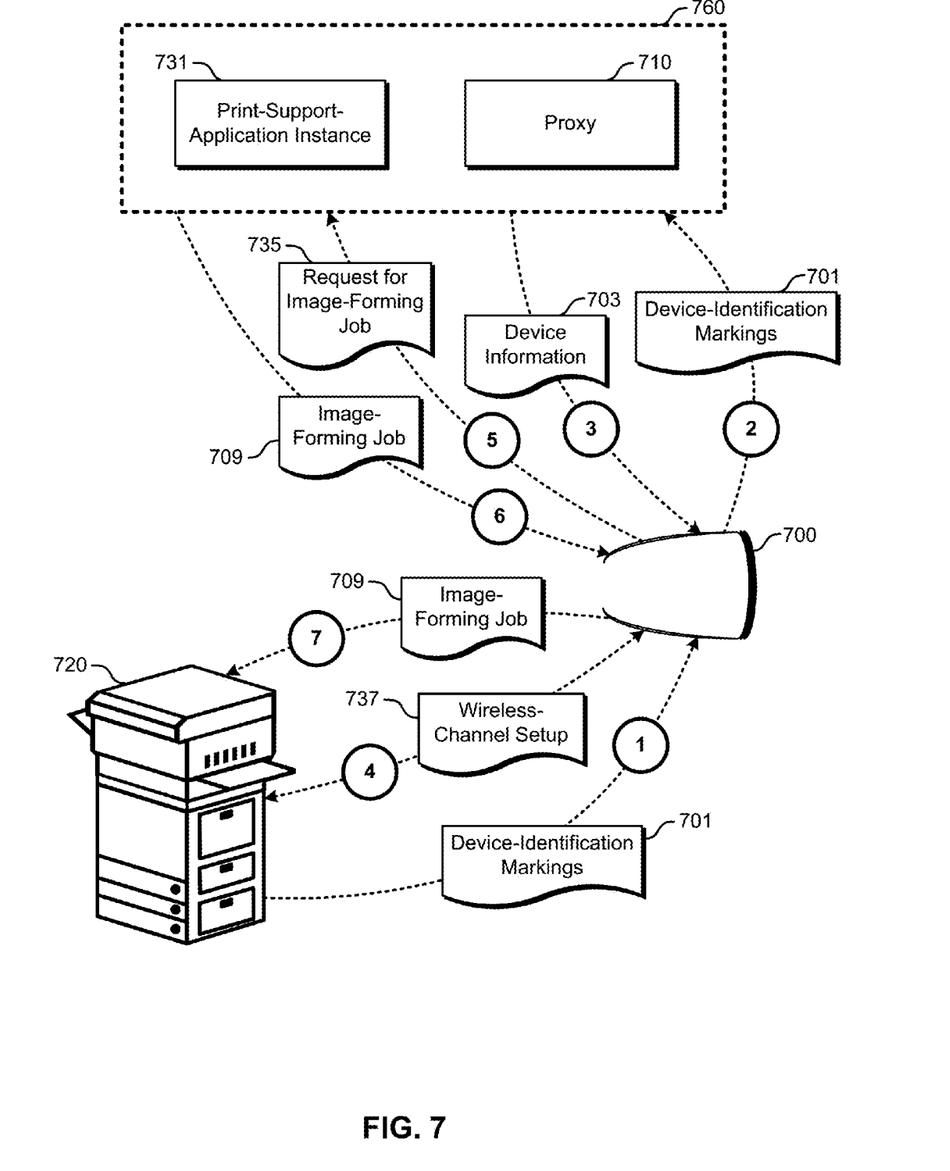
FIG. 7 illustrates an example embodiment of a system for communicating with an image-forming device and an example embodiment of the flow of operations in the system.

FIG. 7 illustrates an example embodiment of a system for communicating with an image-forming device and an example embodiment of the flow of operations in the system. In this embodiment, no print-support-application instance 731 can communicate with the image-forming device 720 except by means of the wearable computing device 700. Also, in the description of FIG. 7, the proxy 710 and the print-support-application instance 731 are abstracted together into a print-support system 760. In stage 1, the wearable computing device 700 obtains device-identification markings 701 for the image-forming device 720. In stage 2, the wearable computing device 700 sends the device-identification markings 701 to the print-support system 760. The print-support system 760 determines device information 703 based on the device-identification markings 701, for example by extracting device information 703 from the device-identification markings 701 or by using the device-identification markings 701 to find the device information 703 in a database. In stage 3, the print-support system 760 sends the device information 703 to the wearable computing device 700. Next, in stage 4, the wearable computing device 700 exchanges wireless-channel setup information 737 with the image-forming device 720 to establish a wireless channel.

The wearable computing device 700 also sends a request for an image-forming job 735 to the print-support system 760 in stage 5. The print-support system 760 obtains the image-forming job 709, and, in some embodiments, formats the image-forming job 709 into a format that can be natively understood by the image-forming device 720. The print-support system 760 sends the image-forming job 709 to the wearable computing device 700 in stage 6. Finally, in stage 7, the wearable computing device 700 sends the image-forming job 709 to the image-forming device 720 via the wireless channel. In some embodiments, the wearable computing device merely forwards the image-forming job 709 without performing any further processing on the image-forming job 709. Also, in some embodiments, the image-forming job 709 that is received by the image-forming device 720 has not been formatted, modified, or otherwise process by the wearable computing device 700 and the print-support system 760, and the image-forming device 720 performs any necessary processing on the image-forming job 709.

Figure 8:
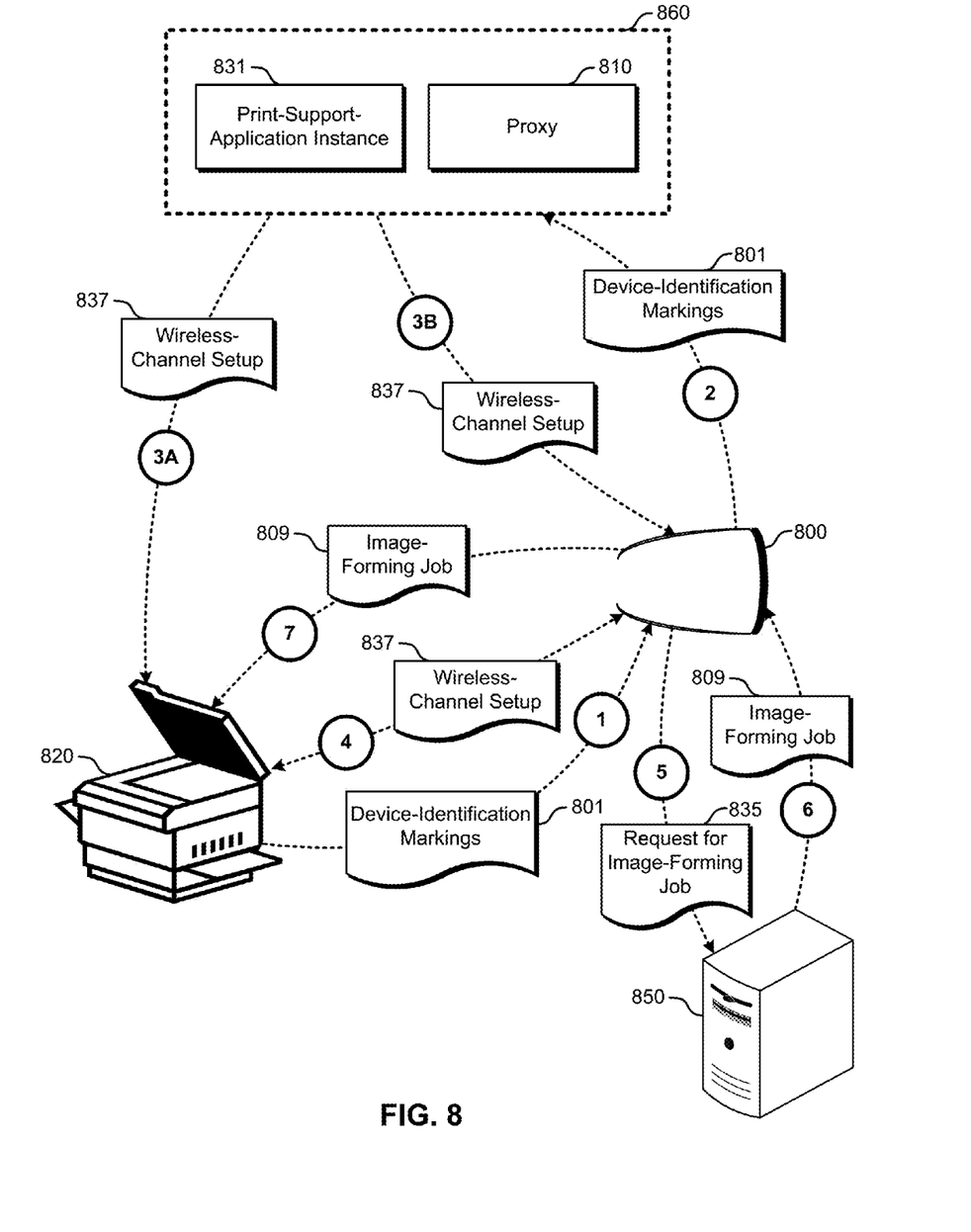
FIG. 8 illustrates an example embodiment of a system for communicating with an image-forming device and an example embodiment of the flow of operations in the system.

FIG. 8 illustrates an example embodiment of a system for communicating with an image-forming device and an example embodiment of the flow of operations in the system. In this embodiment, no print-support-application instance 831 obtains the image-forming job 809. Also, in the description of FIG. 8, the proxy 810 and the print-support-application instance 831 are abstracted together into a print-support system 860. In stage 1, the wearable computing device 800 obtains device-identification markings 801 for the image-forming device 820. In stage 2, the wearable computing device sends the device-identification markings 801 to the print-support system 860. The print-support system 860 determines device information based on the device-identification markings 801, for example by extracting device information from the device-identification markings 801 or by using the device-identification markings 801 to find the device information in a database.

Next, in stage 3A, the print-support system 860 sends wireless-channel setup information 837 to the image-forming device 820, and in stage 3B the print-support system 860 sends wireless-channel setup information 837 to the wearable computing device 800. The wireless-channel setup information 837 may include authentication or authorization information (e.g., a key, a code). Then in stage 4, the wearable computing device 800 and the image-forming device 820 use the wireless-channel setup information 837 to establish a wireless channel. For example, the wearable computing device 800 may send a network key or an authorization code to the image-forming device 820.

In stage 5, the wearable computing device 800 also sends a request for an image-forming job 835 to a print-job-storage device 850. Following, in stage 6, the print-job-storage device 850 sends the image-forming job 809 to the wearable computing device 800. In some embodiments, the print-job-storage device 850 also formats the image-forming job 809 into a format that can be natively understood by the image-forming device 820. Finally, in stage 7, the wearable computing device 800 sends the image-forming job 809 to the image-forming device 820 via the wireless channel.

Figure 9:
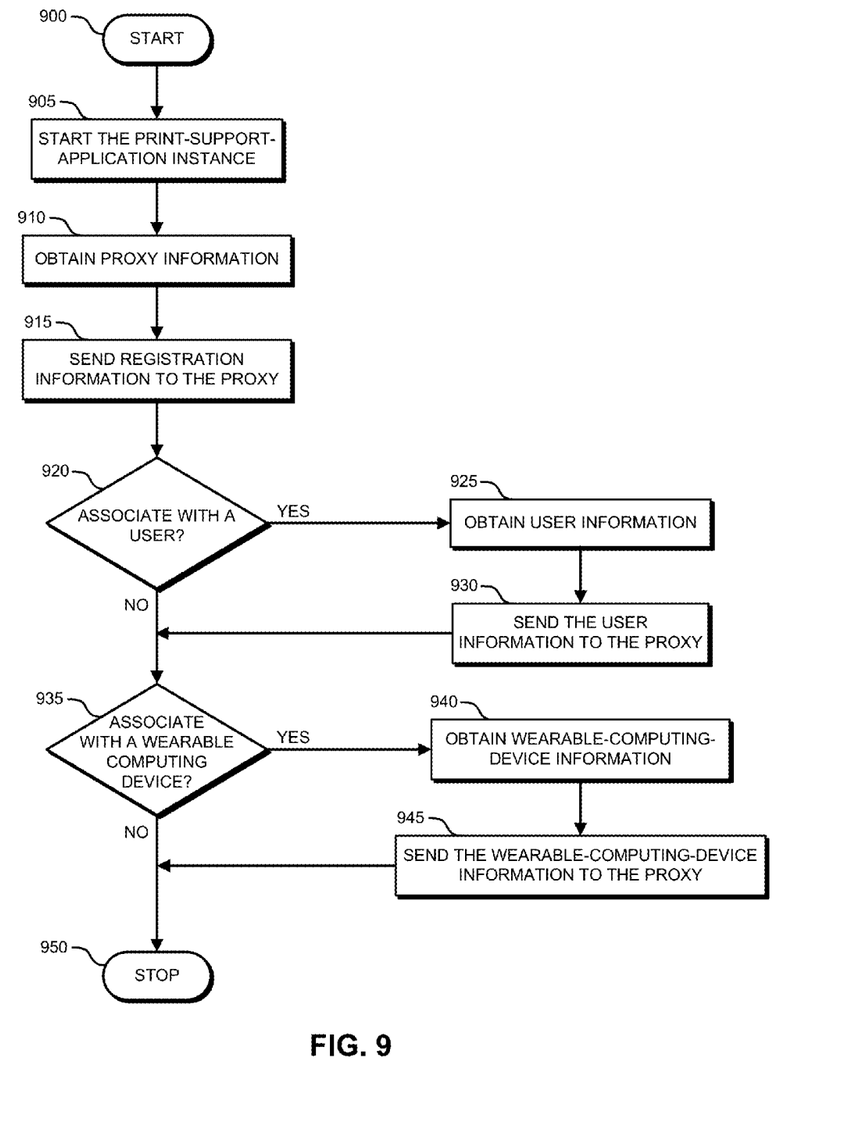
FIG. 9 illustrates an example embodiment of a method for initializing an instance of a print-support application.

FIG. 9 illustrates an example embodiment of a method for initializing an instance of a print-support application. The flow starts in block 900, and then moves to block 905, where the print-support-application instance is started. Next, in block 910, the print-support-application instance obtains proxy information. The proxy information may be provided by a user or be provided with the print-support-application instance. For example, the print-support-application instance may be configured with default proxy information. The flow then moves to block 915, where the print-support-application instance sends registration information to the proxy.

In block 920, the print-support-application instance determines if it is to be associated with a user. If not (block 920=NO), then the flow moves to block 935. If yes (block 920=YES), then the flow moves to block 925, where the print-support-application instance obtains user information. For example, the computing device that operates the print-support-application instance may prompt a user to enter user information (e.g., a user name, another user identifier, a key, a code), which may then be obtained by print-support-application instance. Then in block 930, the print-support-application instance sends the user information to the proxy, and the flow proceeds to block 935.

In block 935, the print-support-application instance determines if it is to be associated with a specific wearable computing device. If not (block 935=NO), then the flow moves to block 950, where the flow ends. If yes (block 935=YES), then the flow moves to block 940, where the print-support-application instance obtains wearable-computing-device information (e.g., a serial number, another unique identifier). For example, the computing device that operates the print-support-application instance may prompt a user to enter the wearable-computing-device information, which may then be obtained by print-support-application instance. Then in block 945, the print-support-application instance sends the wearable-computing-device information to the proxy, and the flow proceeds to block 950, where the flow ends.

Figure 10:
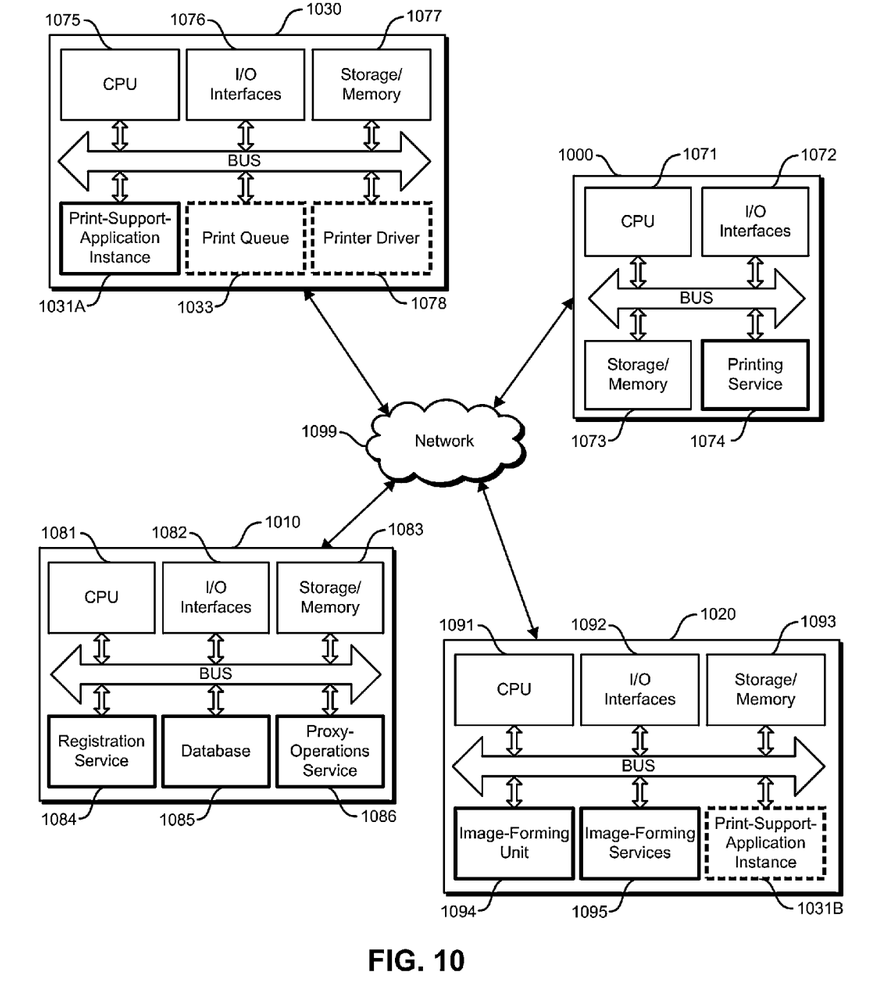
FIG. 10 illustrates an example embodiment of a system for communicating with an image-forming device.

FIG. 10 illustrates an example embodiment of a system for communicating with an image-forming device. The system includes a wearable computing device 1000, a proxy 1010, an image-forming device 1020, and a print-support device 1030, which communicate by means of one or more networks 1099. The print-support device 1030 includes one or more processors (CPU) 1075, I/O interfaces 1076, and storage/memory 1077. The CPU 1075 includes one or more central processing units, which include microprocessors (e.g., a single core microprocessor, a multi-core microprocessor) or other circuits, and the CPU 1075 is configured to read and perform computer-executable instructions, such as instructions in storage or in memory. The I/O interfaces 1076 include communication interfaces to input and output devices, which may include a keyboard, a display, a mouse, a printing device, a touch screen, a light pen, an optical-storage device, a scanner, a microphone, a camera, a drive, and a network (either wired or wireless).

The storage/memory 1077 includes one or more computer-readable or computer-writable media, for example a computer-readable storage medium. A computer-readable storage medium, in contrast to a mere transitory, propagating signal, includes a tangible article of manufacture, for example a magnetic disk (e.g., a floppy disk, a hard disk), an optical disc (e.g., a CD, a DVD, a Blu-ray), a magneto-optical disk, magnetic tape, and semiconductor memory (e.g., a non-volatile memory card, flash memory, a solid-state drive, SRAM, DRAM, EPROM, EEPROM). The storage/memory 1077 can store computer-readable data or computer-executable instructions. The components of the print-support device 1030 communicate via a bus. The print-support device 1030 also includes a print-support-application instance 1031A and, optionally, a print queue 1033, a printer driver 1078, or both.

The wearable computing device 1000 includes a CPU 1071, I/O interfaces 1072, storage/memory 1073, and a printing service 1074. The printing service 1074 controls the image-forming operations of the wearable computing device, such as sending device-identification marks or an output request to the proxy 1010.

The proxy 1010 includes a CPU 1081, I/O interfaces 1082, storage/memory 1083, a registration service 1084, a database 1085, and a proxy-operations service 1086. The registration service 1084 registers print-support-application instances, users, or wearable computing devices. The database 1085 stores information about users, print-support-application instances, or wearable computing devices. The proxy-operations service 1086 communicates with print-support-application instances and wearable computing devices.

The image-forming device 1020 includes a CPU 1091, I/O interfaces 1092, storage/memory 1093, an image-forming unit 1094, image-forming services 1095, and, optionally, a print-support-application instance 1031B. The image-forming unit 1094 includes the software and hardware that form images from one or more media (e.g., paper, plastics, ceramics). The image-forming services 1095 communicate with other computing devices, such as a print-support-application instance that is operating on another computing device.

The print-support-application instances 1031A-B, the print queue 1033, the printer driver 1078, the printing service 1074, the registration service 1084, the proxy-operations service 1086, and the image-forming services 1095 include logic, computer-readable data, or computer-executable instructions, and may be implemented in software (e.g., Assembly, C, C++, C#, Java, BASIC, Perl, Visual Basic), hardware (e.g., customized circuitry), and a combination of software and hardware.

The above-described devices and systems can be implemented, at least in part, by providing one or more computer-readable media that contain computer-executable instructions for realizing the above-described operations to one or more computing devices that are configured to read and execute the computer-executable instructions. The systems or devices perform the operations of the above-described embodiments when executing the computer-executable instructions. Also, an operating system on the one or more systems or devices may implement at least some of the operations of the above-described embodiments.

Any applicable computer-readable medium (e.g., a magnetic disk (including a floppy disk, a hard disk), an optical disc (including a CD, a DVD, a Blu-ray disc), a magneto-optical disk, a magnetic tape, and semiconductor memory (including flash memory, DRAM, SRAM, a solid state drive, EPROM, EEPROM)) can be employed as a computer-readable medium for the computer-executable instructions. The computer-executable instructions may be stored on a computer-readable storage medium that is provided on a function-extension board inserted into a device or on a function-extension unit connected to the device, and a CPU provided on the function-extension board or unit may implement at least some of the operations of the above-described embodiments.

The scope of the claims is not limited to the above-described embodiments and includes various modifications and equivalent arrangements. Also, as used herein, the conjunction "or" generally refers to an inclusive "or," though "or" may refer to an exclusive "or" if expressly indicated or if the context indicates that the "or" must be an exclusive "or."

What is claimed is:

1. A method for device communication, the method comprising:
    receiving, at a proxy device, device information that was sent from a mobile device, wherein the device information includes network information of an image-forming device and was extracted from a barcode captured by the mobile device;
    sending the device information from the proxy device to one or more support devices; and
    at the one or more support devices,
        determining if the image-forming device can communicate with a respective support device, and
        in response to determining that the image-forming device can communicate with the respective support device, generating an output queue for the image-forming device on the respective support device that can communicate with the image-forming device.

2. The method of claim 1, further comprising:
    receiving a notification of success at the proxy device from the respective support device that can communicate with the image-forming device.

3. The method of claim 2, further comprising:
    receiving an output request from the mobile device at the proxy device, wherein the output request identifies an image-forming job; and
    sending the output request from the proxy device to the respective support device that can communicate with the image-forming device.

4. The method of claim 3, further comprising:
    at the respective support device that can communicate with the image-forming device, obtaining the image-forming job and sending the image-forming job to the output queue.

5. The method of claim 4, further comprising:
    obtaining, at the proxy device, the image-forming job from a storage device; and
    sending the image-forming job from the proxy device to the respective support device.

6. The method of claim 3, wherein the output request further includes the image-forming job.

7. The method of claim 1, wherein the barcode is a matrix barcode.

8. A device comprising:
    one or more computer-readable media;
    one or more network interfaces; and one or more processors that are coupled to the one or more computer-readable media and the one or more network interfaces and that are configured to cause the device to
receive device information from a mobile device, wherein the device information identifies an image-forming device,
send the device information to candidate support devices in a first group of support devices,
receive a notification of success from a first support device,
receive an output request from the mobile device, and
send the output request to the first support device.

9. The device of claim 8, wherein the one or more processors are further configured to cause the device to
obtain an image-forming job that is identified by the output request from a storage device; and
send the image-forming job to the first support device.

10. The device of claim 8, wherein the one or more processors are further configured to cause the device to
generate a device record that associates the device information and the first support device; and
store the device record on the one or more computer-readable media.

11. The device of claim 8, wherein the one or more processors are further configured to cause the device to
search a collection of device records that are stored on the one or more computer-readable media for a device record of the image-forming device, wherein the device record associates the image-forming device with a respective support device.

12. The device of claim 8, wherein the one or more processors are further configured to
cause the device to identify a user who is associated with the mobile device, wherein the first group of support devices is associated with the user, and
to cause the device to send the device information to candidate support devices in a second group of support devices if a notification of success is not received from a support device in the first group of support devices within a predetermined period of time.

13. One or more non-transitory computer-readable media storing instructions that, when executed by one or more computing devices, cause the one or more computing devices to perform operations comprising:
receiving device information that was sent by a first device at a proxy device, wherein the device information includes network information of an image-forming device and was extracted from a barcode captured by the first device;
sending the device information to one or more support devices from the proxy device; and
at the one or more support devices,
determining if the image-forming device can communicate with a respective support device, and
in response to determining that the image-forming device can communicate with the respective support device, sending a notification of success to the proxy device.

14. The one or more non-transitory computer-readable media of claim 13, wherein the operations further comprise:
at the respective support device that can communicate with the image-forming device,
installing a driver for the image-forming device, and
installing an output queue for the image-forming device.

15. The one or more non-transitory computer-readable media of claim 13, wherein the operations further comprise:
sending an output request to the respective support device that can communicate with the image-forming device, wherein the output request identifies an output job.

16. The one or more non-transitory computer-readable media of claim 15, wherein the output request further identifies a storage location of the output job, and the operations further comprise obtaining the output job from the storage location.

17. The one or more non-transitory computer-readable media of claim 15, wherein the output request further includes the output job.

18. The one or more non-transitory computer-readable media of claim 13, wherein the image-forming device is an additive-manufacturing device.

19. The one or more non-transitory computer-readable media of claim 13, wherein the image-forming device is a subtractive-manufacturing device.

* * * * *